2 Sheets—Sheet 1.

O. HEIKEL.

Magneto-Electric Machine.

No. 8,796. Reissued July 8, 1879.

Witnesses

Chas H. Smith
Geo. D. Pinckney

Inventor

Otto Heikel per Lemuel W. Serrell

Atty

O. HEIKEL.

Magneto-Electric Machine.

No. 8,796. Reissued July 8, 1879.

Witnesses

Chas. H. Smith,
Geo. S. Pinckney

Inventor

Otto Heikel per Lemuel W. Serrell

Atty.

UNITED STATES PATENT OFFICE.

OTTO HEIKEL, OF JERSEY CITY, NEW JERSEY.

IMPROVEMENT IN MAGNETO-ELECTRIC MACHINES.

Specification forming part of Letters Patent No. 155,376, dated September 29, 1874; Reissue No. 8,796, dated July 8, 1879; application filed January 18, 1879.

*To all whom it may concern:*

Be it known that I, OTTO HEIKEL, of Finland, now residing in Jersey City, in the county of Hudson and State of New Jersey, have invented an Improvement in Magneto-Electric Machines, of which the following is a specification.

I make use of a stationary magnet and an induction-coil that is revolved by mechanism, to produce an electric current for medical and other purposes.

Magnetic motors and engines have been made in which the armatures are revolved by the attraction of electro-magnets, and magneto-electric machines have been constructed in which the induction-coils have been revolved contiguous to permanent or electro magnets.

My present invention relates to a peculiar construction of multipolar induction-coil, in which four or more soft-iron wings or flat cores surround the central shaft, and upon the whole of these wings or arms the insulated wires are wound, so that the spaces between the wings are filled up, or nearly so. Thereby a very great length of wire is introduced into a small space, and the efficiency of the instrument is greatly promoted, and a powerful instrument made in a small compass. I also adjust the permanent magnet in its position relatively to the revolving induction-coil, so as to vary the intensity of the current.

Figure 1:
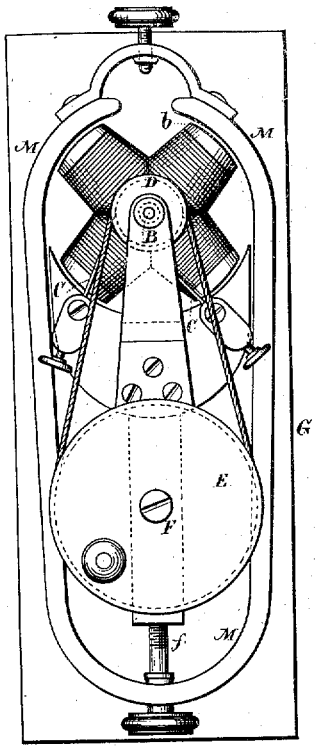
Figure 2:
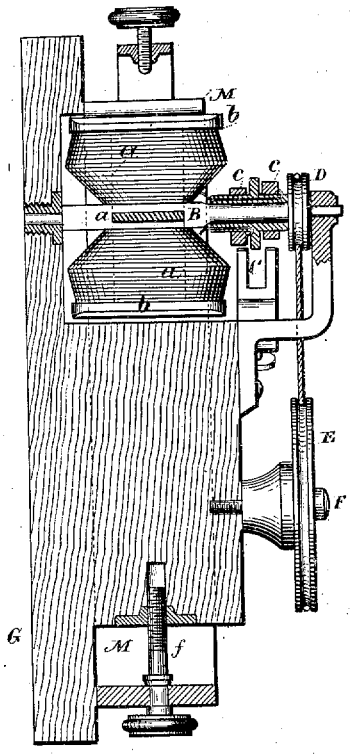
Figure 3:
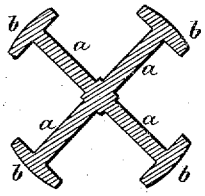
Figure 4:
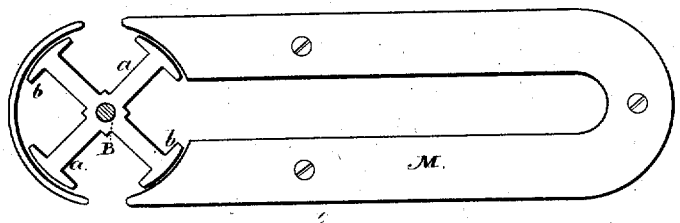
Figure 5:
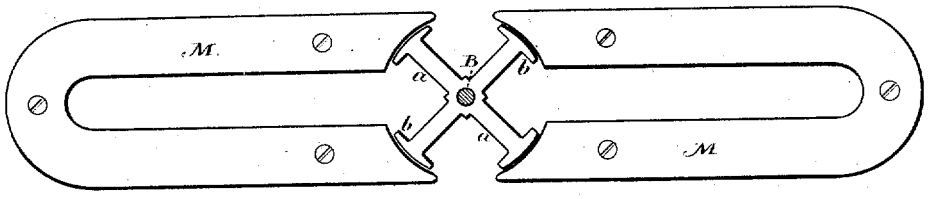
Figure 6:
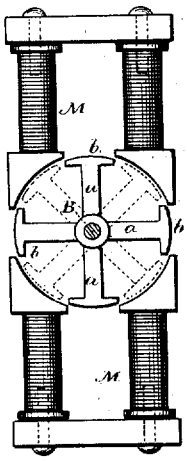

In the drawings, Figure 1 is a plan of the machine complete. Fig. 2 is a central sectional view. Fig. 3 is a section of the wings of the induction-coil. Fig. 4 shows such wings in their relation to a permanent magnet of plates. Fig. 5 is a similar view, showing permanent magnets at opposite sides of the induction-coil. Fig. 6 is an end view, and Fig. 7 is a section, of such induction wings or armatures with electro-magnets around them; and Fig. 8 is an end view of the armatures and four permanent magnets.

The metallic cores or wings *a* are upon a shaft, B, that is set in suitable bearings and revolved by power. The ends of the wings form armatures *b*, and the wheel E on the gudgeon or center F and a band to the pulley D are represented for giving motion to the induction-coil.

The electro or permanent magnet M is of ordinary construction, except that its poles are curved to be contiguous to a portion of the path described by the revolution of the induction-coil armatures *a*; and I remark that when an electro-magnet is employed the current is derived from any suitable source—such as a battery, or from the electricity induced in the machine.

Figure 7:
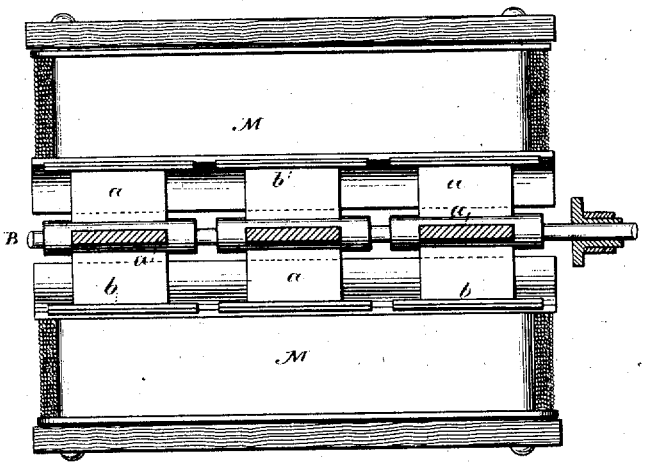
Figure 8:
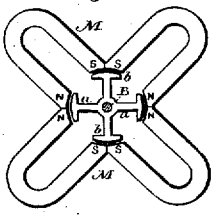

With the electro-magnet shown in Figs. 6 and 7 the induction-coils may be numerous and placed on one shaft, and it is better to position those induction-coils that are connected to the helix of the electro-magnet intermediately, as indicated by dotted lines in Fig. 6. The flat wings forming the cores are placed lengthwise of the shaft in rows.

The commutator or circuit-closer is of any suitable character. I have shown the same as composed of two insulated rings, *c*, upon the shaft B, against which forked springs C rest, that are connected with the binding-screws and conducting wires or cords, and the ends of the wires of the induction-coil connect with these respective circuit-closers C; and these disks *c* are star or cam shaped, so as to close the circuit by contact with the springs, as usual in commutators.

The peculiarity of my induction-coil will be understood upon reference to Figs. 1, 2, and 3. The arms or wings *a a*, forming the cores, are at right angles to each other, and terminate as segmental armature-heads *b*. The insulated wire is connected at one of its ends to one of the rings of the circuit-closing disks *c*, and wound upon the cores. It is best to wind one layer of wire out and back upon one arm *a*, then one layer out and back upon the opposite arm *a*, and then first one and then the other of the remaining arms is wound. Then the operator commences a second layer upon the arm first covered, and applies that second layer to all the arms successively, in the original order, then a third layer, and so on until the entire four arms are filled in, as seen in Figs. 1 and 2.

Of course the coils of wire around one flat core lie contiguous to those around the adjacent flat core, and assume a conical form outwardly from the base of the arms, where they unite with the shaft; and the helices, wound as aforesaid around the four flat cores, form a compound induction-coil, the outer ends of the wire being united with the circuit-closing disks. This form of induction-coil-revolving armature is very compact and efficient.

In order to vary the intensity of the current or shock, the magnet M is made adjustable in relation to the revolving induction-coil. This is accomplished by the screw *f*, that passes through the bend of the magnet into a block on the base G. Hence the magnet is held; but its poles can be moved farther from or nearer to the revolving induction-coil, and thereby the intensity of the shock or current is determined.

In this magneto-electric machine the flattened cores stand radially and lengthwise of the shaft in a plane passing through the axis of motion. The wires of the helices at the sides of the flattened cores pass transversely through the magnetic field of the stationary magnets, and there being four or more of these cores, the maximum inductive effect is obtained; and where several flattened cores are placed lengthwise of the shaft, as in Fig. 7, there are numerous separate helices on the one revolving shaft, energized by one set of field-of-force magnets, the cores of which are flat or extended in the same direction as the armature-cores. By arranging the field-of-force magnets with the same poles in contact or adjacent, as in Fig. 8, the magnetic fields of each polarity are enlarged and their strength increased, and the induced current is increased, and the poles of the magnets are of the same shape at the entering and leaving sides, and the magnetism is more uniform than it is when the poles are curved, as in Fig. 5, because one edge of each pole is alternated and the other edge is abrupt; hence the magnetic actions will be different.

In Letters Patent No. 94,014 the cores of the revolving armature are connected in pairs and insulated from the adjacent pairs of cores; hence there is no magnetic action between one pair of cores and the next pair.

In my magneto electric machine all the cores are axial—that is, their longest measurement is in the direction of the axis of revolution, and each core radiates from a common core or central shaft. Thereby the magnetism of each core acts, through the common central core, to intensify the action of the adjoining cores, and each set of armature-cores, having one common central core, form one group, and I place two or more of these groups side by side on one shaft to increase the strength of the machine or to generate separate currents.

Revolving armatures have had four square, or nearly square, arms placed radially; and in other instances the armature has had two long poles, the helix being around the flat core. In these cases there are not any flat faces of opposite polarity with the helix in the intervening space. I find that, the surfaces of the long armature-cores being at opposite sides of the space occupied by the helices, there is an action and reaction that intensifies the magnetism and the secondary current set up in the helices.

I claim as my invention—

1. The revolving induction-coil made of the four or more flat cores or wings *a* and heads *b*, upon all of which cores or wings a continuous insulated wire is wound in the successive layers, substantially as and for the purposes set forth.

2. In a magneto-electric machine, four or more flattened armature-cores, radiating from one common core or revolving shaft, and their helices, in combination with two or more field-of-force magnets, the flat cores of which correspond in position with the cores of the helices, substantially as set forth.

3. In a magneto-electric machine, two or more groups of armature-cores, placed side by side and lengthwise of the revolving shaft, each group of armature-cores being composed of four or more radial cores from one common core, and having a helix around each core, in combination with the field-of-force magnets, the cores of which are sufficiently long in the direction of the axis of rotation to extend over all the groups of revolving armature-cores, substantially as specified.

4. Four or more field-of-force magnets entirely surrounding the revolving armature-cores, and connected so that the same poles of the magnets are together, and they alternate in polarity around the revolving armatures, substantially as set forth.

Signed by me this 15th day of January, A. D. 1879.

OTTO HEIKEL.

Witnesses:
GEO. T. PINCKNEY,
CHAS. H. SMITH.